(12) United States Patent
Kato

(10) Patent No.: US 11,284,057 B2
(45) Date of Patent: Mar. 22, 2022

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Yuji Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/683,043

(22) Filed: Nov. 13, 2019

(65) Prior Publication Data

US 2020/0084431 A1 Mar. 12, 2020

Related U.S. Application Data

(63) Continuation of application No. PCT/JP2019/001997, filed on Jan. 23, 2019.

(30) Foreign Application Priority Data

Feb. 16, 2018 (JP) .............................. JP2018-025826

(51) Int. Cl.
*H04N 13/282* (2018.01)
*H04N 13/279* (2018.01)
(Continued)

(52) U.S. Cl.
CPC ......... *H04N 13/282* (2018.05); *H04N 13/271* (2018.05); *H04N 13/279* (2018.05); *H04N 13/293* (2018.05)

(58) Field of Classification Search
CPC .. H04N 13/282; H04N 13/279; H04N 13/271; H04N 13/293
See application file for complete search history.

(56) References Cited

U.S. PATENT DOCUMENTS

2004/0095353 A1* 5/2004 Ueda ....................... A63F 13/10
345/473
2004/0192424 A1* 9/2004 Mori ..................... A63F 13/525
463/8

(Continued)

FOREIGN PATENT DOCUMENTS

CN 1361506 A 7/2002
JP H0969169 A 3/1997
(Continued)

OTHER PUBLICATIONS

Kunihiko Hayashi, et al., Synthesizing free-viewpoint images from multiple view videos in soccer stadium, IPSJ SIG Technical Report, 2006, vol. 2006, No. 51, pp. 173-180.

*Primary Examiner* — Peet Dhillon
(74) *Attorney, Agent, or Firm* — Canon U.S.A., Inc. IP Division

(57) ABSTRACT

The image processing apparatus that generates a virtual viewpoint image includes a generation unit. The generation unit generates a virtual viewpoint image in which in accordance with a virtual viewpoint specified by the virtual viewpoint information. The degree of transparency of a specific object at a position a specific distance apart from a position of a first virtual viewpoint in a virtual viewpoint image in accordance with the first virtual viewpoint corresponding to a first angle of view, which is generated by the generation unit, is higher than a degree of transparency of an object at a position the specific distance apart from a position of a second virtual viewpoint in a virtual viewpoint image in accordance with the second virtual viewpoint corresponding to a second angle of view larger than the first angle of view.

18 Claims, 8 Drawing Sheets

(51) Int. Cl.
*H04N 13/271* (2018.01)
*H04N 13/293* (2018.01)

(56) References Cited

U.S. PATENT DOCUMENTS

| | | | |
|---|---|---|---|
| 2006/0046844 A1* | 3/2006 | Kaneko | A63F 13/10 |
| | | | 463/32 |
| 2008/0024523 A1* | 1/2008 | Tomite | G06T 19/006 |
| | | | 345/632 |
| 2008/0094417 A1* | 4/2008 | Cohen | A63F 13/52 |
| | | | 345/632 |
| 2010/0020160 A1* | 1/2010 | Ashbey | H04N 13/261 |
| | | | 348/43 |
| 2011/0304699 A1* | 12/2011 | Ito | A63F 13/52 |
| | | | 348/47 |
| 2012/0098833 A1* | 4/2012 | Katano | G06T 15/50 |
| | | | 345/427 |
| 2012/0113228 A1* | 5/2012 | Konno | H04N 13/356 |
| | | | 348/47 |
| 2012/0146993 A1* | 6/2012 | Ebisawa | G06T 15/04 |
| | | | 345/419 |
| 2012/0182403 A1* | 7/2012 | Lange | H04N 13/388 |
| | | | 348/51 |
| 2013/0057574 A1* | 3/2013 | Shimizu | G06T 15/20 |
| | | | 345/619 |
| 2014/0253538 A1* | 9/2014 | Bailiang | G06T 19/00 |
| | | | 345/419 |
| 2018/0109751 A1* | 4/2018 | Choi | G06K 9/00671 |

FOREIGN PATENT DOCUMENTS

| | | |
|---|---|---|
| JP | H1142370 A | 2/1999 |
| JP | 2000149062 A | 5/2000 |
| JP | 2002049936 A | 2/2002 |
| JP | 2006068138 A | 3/2006 |
| JP | 2008071260 A | 3/2008 |
| JP | 2012123337 A | 6/2012 |
| JP | 2015114716 A | 6/2015 |

\* cited by examiner

IMAGE PROCESSING APPARATUS, IMAGE PROCESSING METHOD AND STORAGE MEDIUM

CROSS-REFERENCE TO RELATED APPLICATIONS

This application is a Continuation of International Patent Application No. PCT/JP2019/001997, filed Jan. 23, 2019, which claims the benefit of Japanese Patent Application No. 2018-025826, filed Feb. 16, 2018, both of which are hereby incorporated by reference herein in their entirety.

BACKGROUND OF THE INVENTION

Technical Field

The present invention relates to a display control technique to improve image quality of a virtual viewpoint video image.

Background Art

As a technique to reproduce a video image from a camera (virtual camera) not existing actually, which is arranged virtually within a three-dimensional space, by using video images captured by a plurality of real cameras, there is a virtual viewpoint video image generation technique. The virtual viewpoint video image generation technique is expected as a video image representation with a high feeling of being at a live performance in sports broadcast and the like. Here, in image capturing by a general camera, the nearer to an object, the higher the image resolution that is obtained is. However, in a case of a virtual camera, even though the virtual camera is put near to the object, it is not possible to obtain an image with a definition higher than the resolution of an image captured by a real camera. In particular, in a case where the virtual camera is set at a position whose distance from the object is shorter than a predetermined distance, drawing is performed by enlarging the captured image by the real camera, and therefore, the image resolution is reduced accordingly. As a result of this, an image with a low definition will be generated, which causes a sense of incongruity of a user. In this point, among techniques that produce a 3D video image display in a virtual space by using a left-eye image and a right-eye image, there is a technique to suppress a sense of incongruity accompanying a 3D view by drawing a small object located farther at a higher degree of transparency (PTL 1).

CITATION LIST

Patent Literature

PTL 1 Japanese Patent Laid-Open No. 2012-123337

SUMMARY OF THE INVENTION

Problems to be Solved by the Invention

The starting point of the technique of PTL 1 described above is that as the distance from a viewpoint becomes longer, the width in the disparity direction becomes narrower, and therefore, the portion of an object that is not displayed partially is different between the right-eye image and the left-eye image and this causes flicker or the like to occur in the object, and then, a sense of discomfort is brought to a user. In contrast to this, the cause of the sense of incongruity in the virtual viewpoint video image described above is that the resolution of the virtual viewpoint video image depends on the resolution of the video image captured by a real camera, which is the source thereof, and the cause of the occurrence of the sense of discomfort and that of the sense of incongruity are quite different. Consequently, even though the technique of PTL 1 described above is applied to generation of the virtual viewpoint video image, it is not possible to solve the problem that the shorter the distance between the virtual camera and the object, the lower the image quality becomes.

Means for Solving Problem

The image processing apparatus according to the present invention is an image processing apparatus that generates a virtual viewpoint image, the image processing apparatus including: an image data acquisition unit configured to acquire image data based on image capturing from a plurality of directions by a plurality of cameras, an information acquisition unit configured to acquire virtual viewpoint information representing a position and a direction of a virtual viewpoint and an angle of view corresponding to a virtual viewpoint; and a generation unit configured to generate, based on image data acquired by the image acquisition unit and virtual viewpoint information acquired by the information acquisition unit, a virtual viewpoint image in accordance with a virtual viewpoint specified by the virtual viewpoint information, wherein a degree of transparency of a specific object at a position a specific distance apart from a position of a first virtual viewpoint in a virtual viewpoint image in accordance with the first virtual viewpoint corresponding to a first angle of view, which is generated by the generation unit, is higher than a degree of transparency of an object at a position the specific distance apart from a position of a second virtual viewpoint in a virtual viewpoint image in accordance with the second virtual viewpoint corresponding to a second angle of view larger than the first angle of view, which is generated by the generation unit.

Advantageous Effect of the Invention

According to the present invention, even in a case where an object exists at a position near to a set virtual camera, a reduction in image quality is made less conspicuous, and therefore, it is made possible to improve image quality of a virtual viewpoint video image.

Further features of the present invention will become apparent from the following description of exemplary embodiments with reference to the attached drawings.

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention.

First Embodiment

In the present embodiment, a drawing method is explained, which improves image quality of a virtual viewpoint video image by making transparent an object existing in the vicinity of a virtual camera to make the object less conspicuous. The virtual viewpoint video image is a video image generated by an end user and/or an appointed operator or the like freely operating the position and orientation of a virtual camera and also called a free-viewpoint video image, an arbitrary viewpoint video image, and the like. Further, the virtual viewpoint video image may be a moving image or a still image. In the present embodiment, an example in a case where the virtual viewpoint video image is a moving image is explained mainly.

Figure 1:
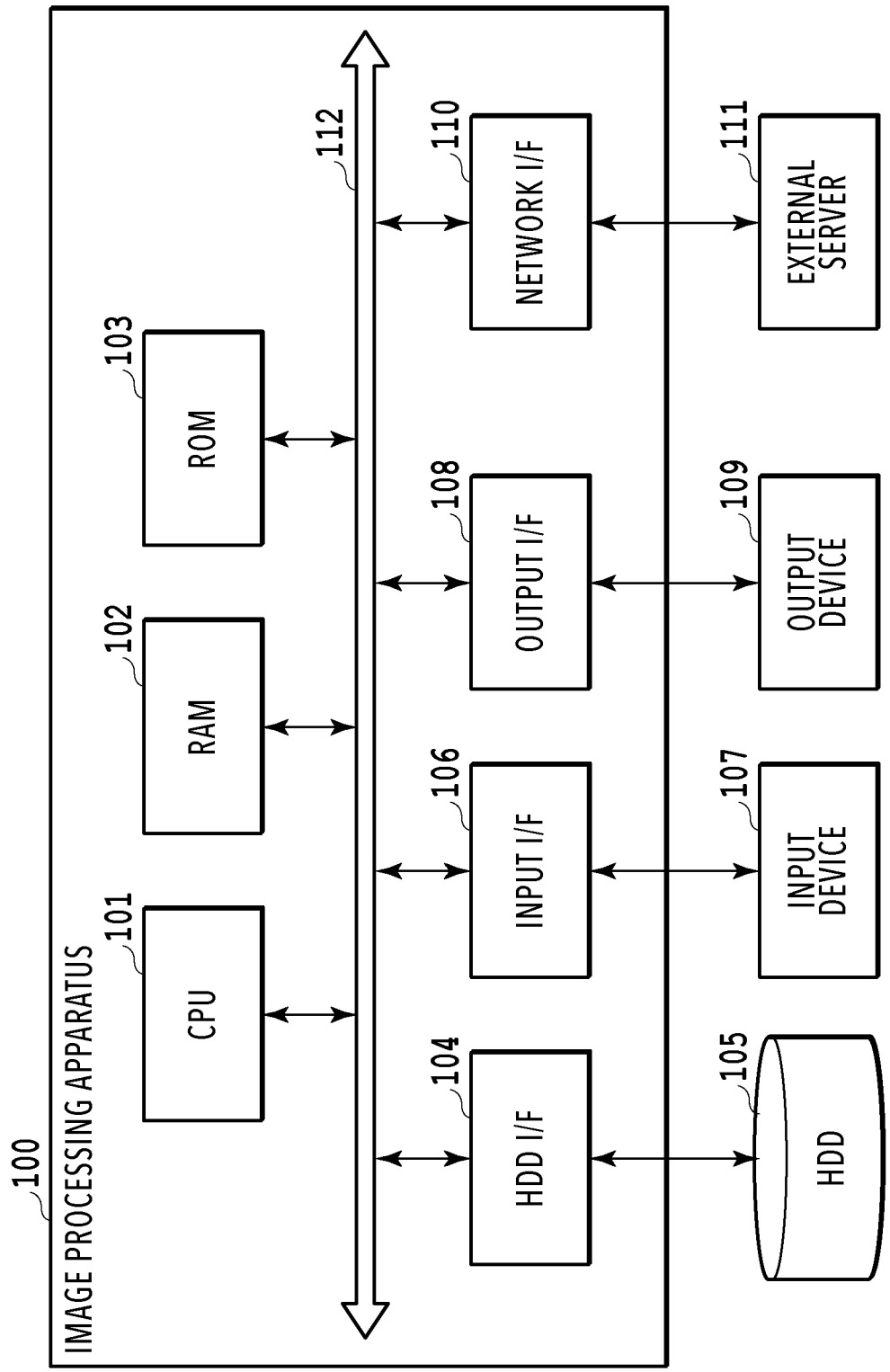
FIG. 1 is a block diagram showing a hardware configuration example of an image processing apparatus.

The hardware configuration example of an image processing apparatus 100 in the present embodiment is explained by using FIG. 1. In FIG. 1, a CPU 101 executes programs stored in a ROM 103 and/or a hard disk drive (HDD) 105 by using a RAM 102 as a work memory and controls each configuration, to be described later, via a system bus 112. Due to this, various kinds of processing, to be described later, are performed. An HDD interface (I/F) 104 is an interface, for example, such as a serial ATA (SATA), which connects the image processing apparatus and the HDD 105 and a secondary storage device, such as an optical disc drive. It is possible for the CPU 101 to read data from the HDD 105 and write data to the HDD 105 via the HDD I/F 104. Further, the CPU 101 loads the data stored in the HDD 105 onto the RAM 102. Furthermore, it is possible for the CPU 101 to save various kinds of data on the RAM 102, which are obtained by execution of the programs, in the HDD 105. An input interface (I/F) 106 is a serial bus interface, for example, such as USB and IEEE 1394, which connects an input device 107, such as a keyboard, a mouse, a digital camera, and a scanner, and the image processing apparatus 100. It is possible for the CPU 101 to read data from the input device 107 via the input I/F 106. An output interface (I/F) 108 is a video image output interface, for example, such as DVI and HDMI (registered trademark), which connects an output device 109, such as a display, and the image processing apparatus 100. It is possible for the CPU 101 to display a virtual viewpoint video image by sending data relating to the virtual viewpoint video image to the output device 109 via the output I/F 108. A network interface (I/F) 110 is a network card, for example, such as a LAN card, which connects the image processing apparatus 100 and an external server 111. It is possible for the CPU 101 to read data from the external server 111 via the network I/F 110.

In the above-described explanation, the example is explained in which the HDD 105, the input device 107, and the output device 109 are configured as devices separate from the image processing apparatus 100. However, the aspect is not limited to this. For example, the image processing apparatus 100 may be a smartphone or the like and in this case, the input device 107 (touch panel) and the output device 109 (display screen) are integrated into one unit with the image processing apparatus 100. Further, it is also possible to use a built-in device of the HDD 105 as the image processing apparatus 100. Furthermore, all the configurations shown in FIG. 1 are not necessarily indispensable configurations. For example, in a case where a virtual viewpoint video image stored in the HDD 105 is reproduced, the external server 111 is not necessary. On the contrary, in a case where a virtual viewpoint video image acquired from the external server 111 is generated, the HDD 105 is not necessary. Further, the image processing apparatus 100 may have a plurality of the CPUs 101. Furthermore, it may also be possible for the image processing apparatus 100 to have one or a plurality of pieces of dedicated hardware or a GPU (Graphics Processing Unit) different from the CPU 101 and cause the GPU or the dedicated hardware to perform at least part of the processing by the CPU 101. As an example of the dedicated hardware, there are an ASIC (Application-Specific Integrated Circuit), an FPGA (Field Programmable Gate Array), a DSP (Digital Signal Processor), and the like.

Figure 2:
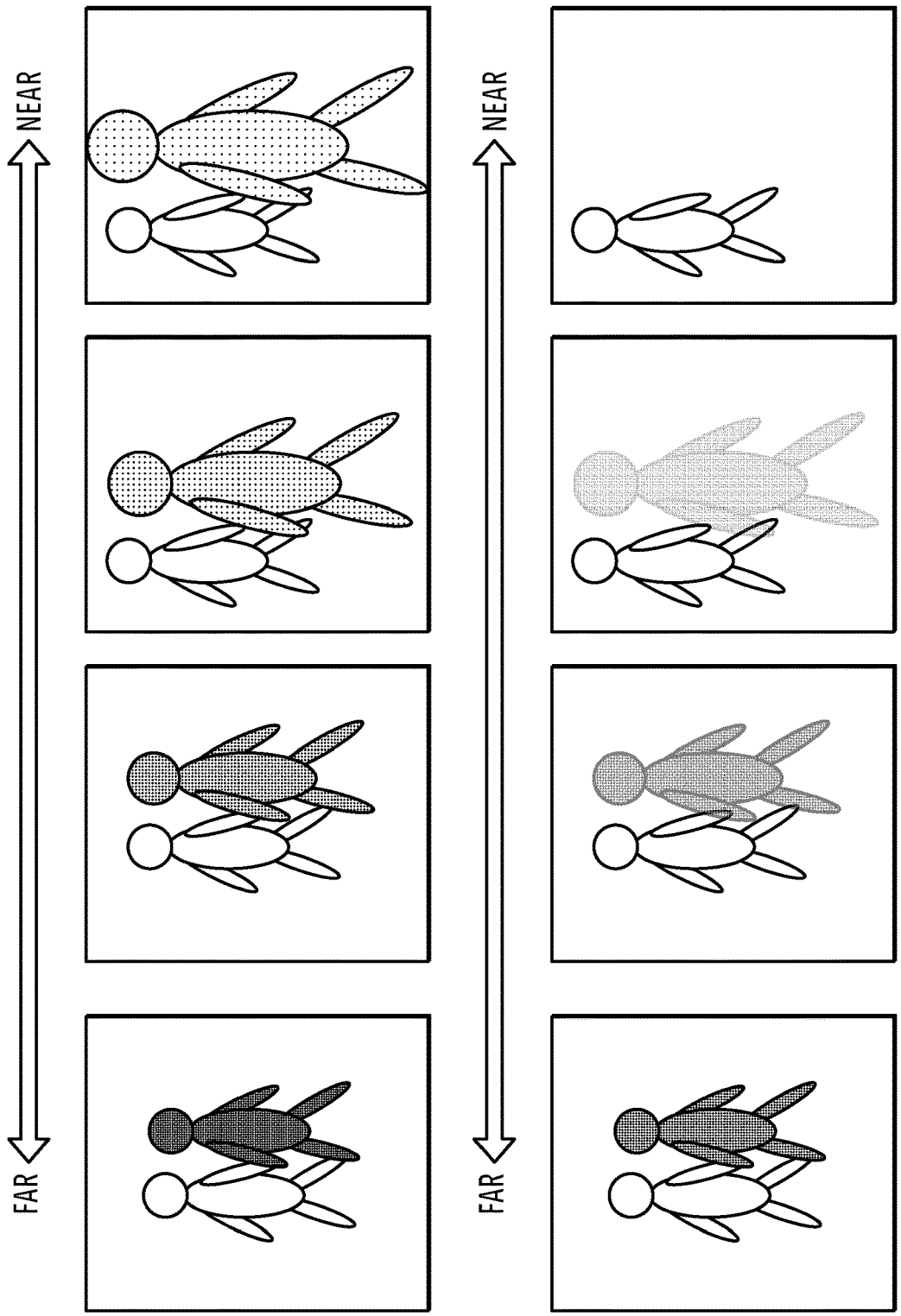
FIG. 2A is a diagram showing an example in a case where drawing of a virtual viewpoint video image is performed without controlling the degree of transparency and FIG. 2B is a diagram showing an example in a case where drawing of a virtual viewpoint video image is performed by controlling the degree of transparency.

In the present embodiment, by changing the degree of transparency of an object within an image capturing scene in accordance with the distance from the virtual camera, the area near to the virtual camera, in which a reduction in resolution occurs, is made less conspicuous. Here, the way of thinking of the control of the degree of transparency in the present embodiment is explained. FIG. 2A shows an example in a case where drawing of a virtual viewpoint image is performed without controlling the degree of transparency and FIG. 2B shows an example in a case where drawing of a virtual viewpoint image is performed by controlling the degree of transparency. In FIG. 2A and FIG. 2B respectively, four images are put side by side in which two objects (persons) are drawn by a virtual camera at the same position and with the same orientation. In each of FIG. 2A and FIG. 2B, in the image that is nearer to the right end, the object on the right side exists at the position nearer to the virtual camera. In a case of the present embodiment, for generation of the texture data of the object, images captured by a real camera are used. Because of this, for the object located at a position whose distance is shorter than a predetermined distance, the nearer the position of the object to the virtual camera, the more the texture image is enlarged and drawn, and therefore, the resolution is reduced and the image becomes coarse. Consequently, as shown in FIG. 2B, in a case where the distance from the virtual camera is less than or equal to a predetermined distance, control is performed so that the nearer to the virtual camera, the higher the degree of transparency is. The nearer the object on the right side within the image to the virtual camera, the more the texture image is enlarged and drawn and this is the same as in the case in FIG. 2A where the control of the degree of transparency is not performed, but by making the object transparent, the reduction in the resolution becomes less conspicuous.

Figure 3:
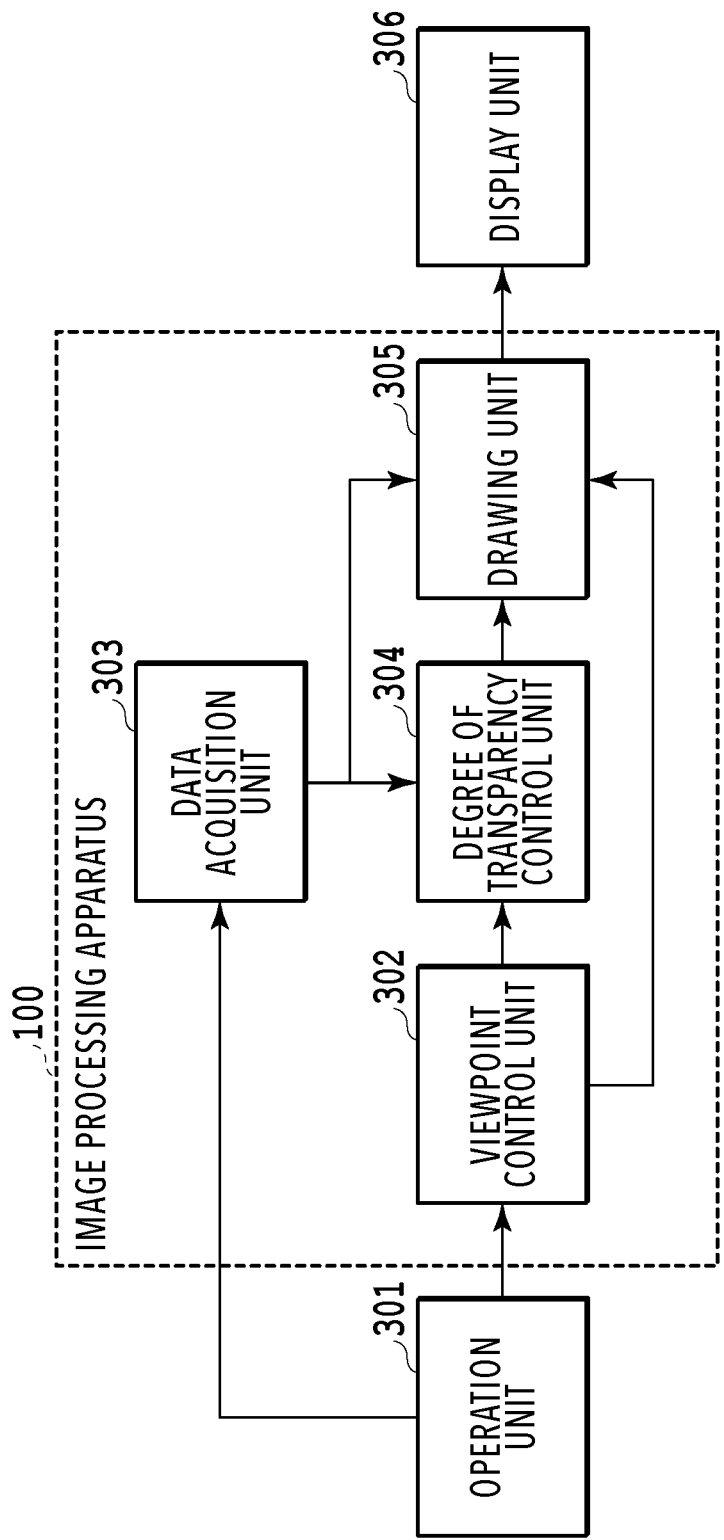
FIG. 3 is a block diagram showing a function configuration of the image processing apparatus.

In the following, by taking, as an example, the processing at the time of generating a virtual viewpoint image of a moving image (hereinafter, virtual viewpoint video image) in accordance with a position and a direction of a virtual viewpoint from a multi-viewpoint image of a moving image (hereinafter, multi-viewpoint video image) obtained by performing image capturing from a plurality of directions by a plurality of cameras, the configuration and the like of the image processing apparatus 100 of the present embodiment are explained in detail. FIG. 3 is a function block diagram showing an example of the logic configuration of the image processing apparatus 100. The CPU 101 plays a role of each function block inside the image processing apparatus 100 shown in FIG. 3 by reading programs stored in the ROM 103 and/or the HDD 104 and executing the programs by using the RAM 102 as a work area. An operation unit 301 and a display unit 306 in FIG. 3 correspond to the input device 107 and the output device 103 respectively in FIG. 1. Further, it is not necessary for the CPU 101 to play a role of all the function blocks inside the image processing apparatus 100 and it may also be possible to provide a dedicated processing circuit corresponding to each function block.

Figure 4:
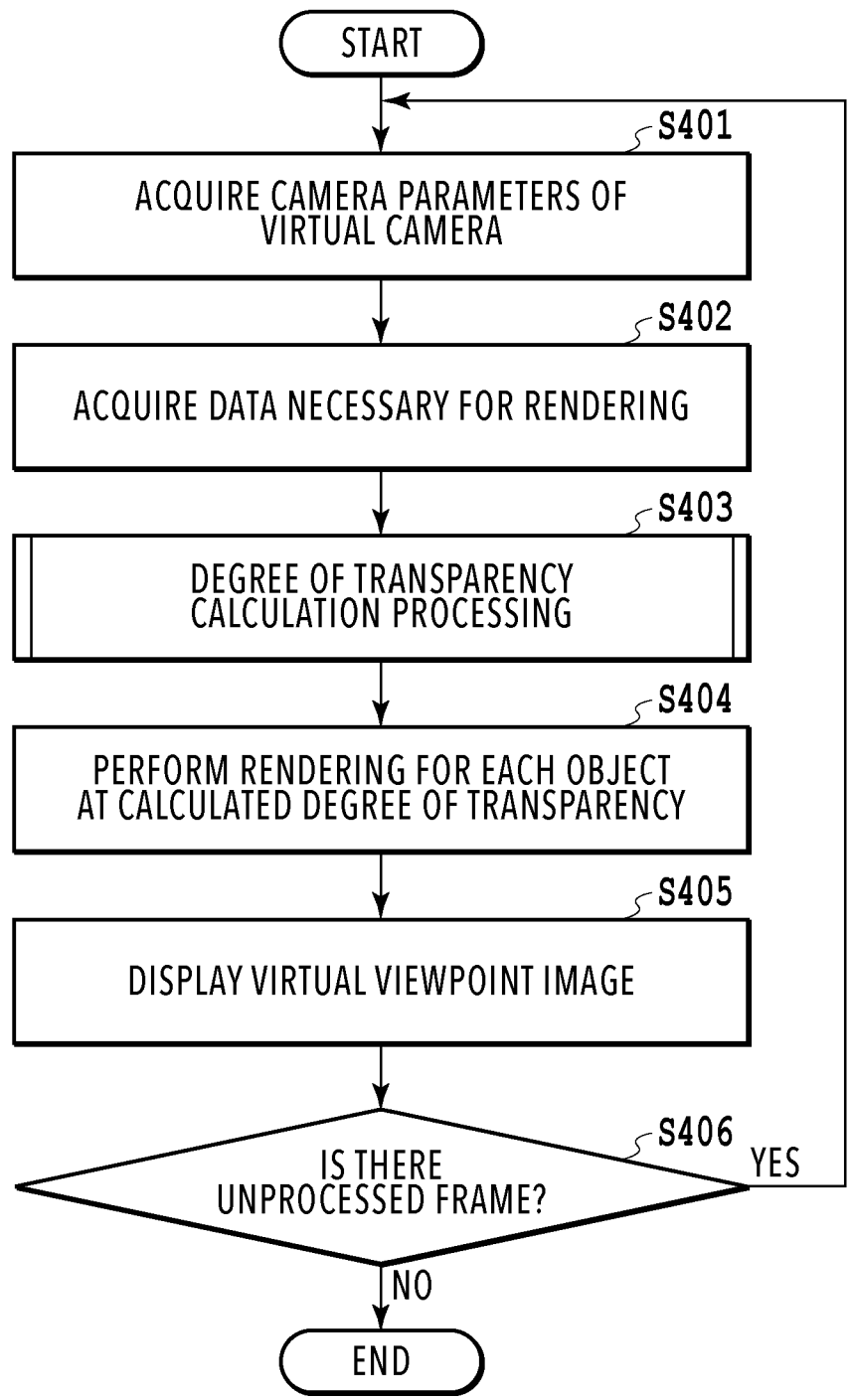
FIG. 4 is a flowchart showing a flow of image processing to generate a virtual viewpoint video image from a multi-viewpoint video image.

FIG. 4 is a flowchart showing a flow of image processing to generate a virtual viewpoint video image from a multi-viewpoint video image, which is performed by the image processing apparatus 100 of the present embodiment. The series of processing indicated in the flowchart in FIG. 4 is implemented by the CPU 101 comprised by the image processing apparatus 100 reading the programs stored in the ROM 103 and/or the HDD 104 and executing the programs by using the RAM 102 as a work area. Symbol "S" in the explanation of each piece of processing represents a step.

At S401, a viewpoint control unit 302 acquires camera parameters of the virtual camera corresponding to the target frame among the set frames of the captured multi-viewpoint video image. In a case where the multi-viewpoint video image is captured at 60 fps and a virtual viewpoint video image is generated by taking frames corresponding to ten seconds as set frames, a total of 600 frames become target frames sequentially. Here, the camera parameters include external parameters and internal parameters. The external parameters are parameters representing the position and orientation (direction) of the virtual camera and the internal parameters are parameters representing the optical characteristic of the virtual camera. In a case where a vector representing the position of the virtual camera is taken to be t and a matrix representing rotation to be R, it is possible to express the external parameters of the virtual camera as follows.

$$\begin{bmatrix} R & t \\ 0 & 1 \end{bmatrix}$$ [Mathematical Expression]

The coordinate system here is the left-handed coordinate system and the rightward direction at the viewpoint of the virtual camera is taken to be the +x-direction, the upward direction to be the +y-direction, and the direction toward the front (back) to be the +z-direction. Further, in a case where the main position of the image is taken to be ($c_x$, $c_y$) and the focal length of the real camera to be f, it is possible to express an internal parameter K of the virtual camera as follows.

$$K = \begin{bmatrix} f & 0 & c_x \\ 0 & f & c_y \\ 0 & 0 & 1 \end{bmatrix}$$ [Mathematical Equation 2]

The representation method of the camera parameters is not limited to a matrix. For example, it may also be possible to represent the position of the virtual camera by three-dimensional coordinates and represent the orientation of the virtual camera by enumerating the values of yaw, roll, and pitch. Further, the external parameters and the internal parameters are not limited to those described above. For example, it may also be possible to acquire information representing the zoom value of the virtual camera as the internal parameter of the virtual camera. At this step, the viewpoint control unit 302 having received the user operation relating to the position/orientation of the virtual camera, which is input via the operation unit 301, which is an example of the user interface, generates the external camera parameters of the virtual camera in accordance with the user operation. For example, such external parameters are generated by which the orientation of the virtual camera rotates in the rightward direction in a case where a user moves the mouse in the rightward direction and the orientation of the virtual camera changes to the upward direction in a case where a user moves the mouse in the upward direction. As to the internal parameters, it is sufficient to read the internal parameters stored in advance in the HDD 105 or the like. The camera parameters of the virtual camera thus acquired as the viewpoint information that is used for drawing are output to a degree of transparency control unit 304 and a drawing unit 305.

Figure 5A:
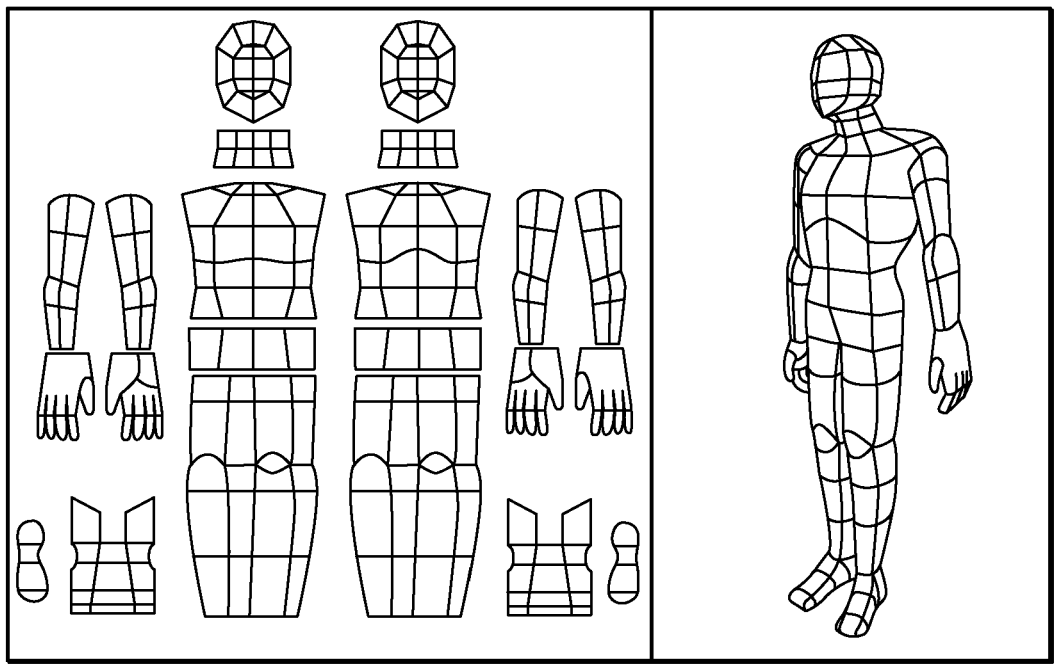
FIG. 5A is a diagram showing an example of polygon data and FIG. 5B is a diagram showing an example of texture data.
Figure 5B:
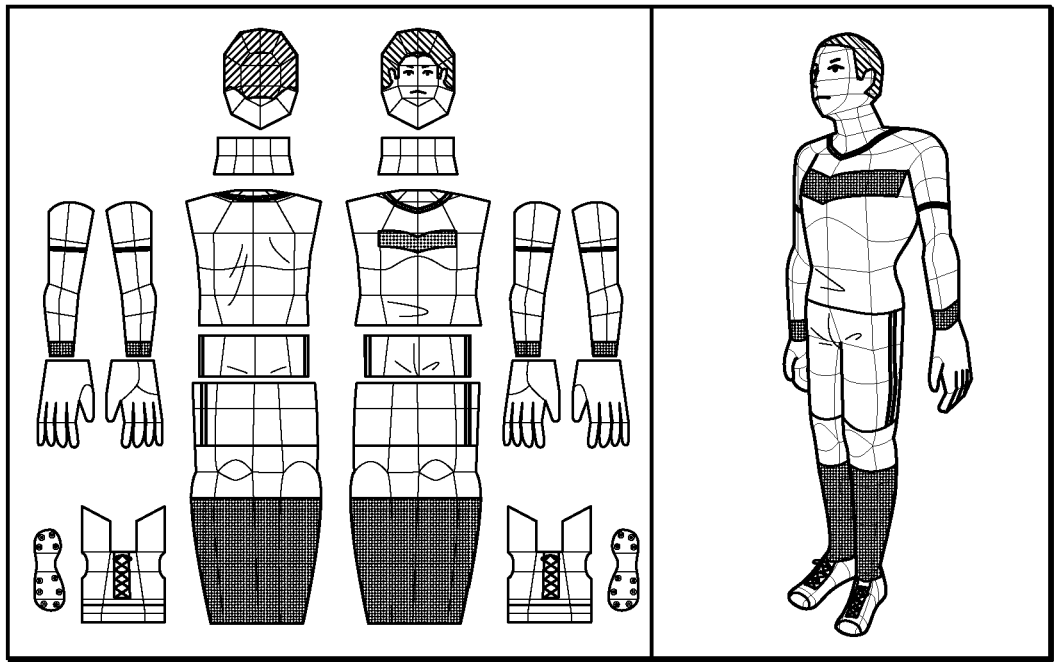

At S402, a data acquisition unit 303 acquires image data necessary for rendering from the HDD 105 or the external server 111. Specifically, polygon data and texture data of an object included within an image capturing scene of a processing target-frame among the set time frames are acquired. FIG. 5A and FIG. 5B are each an example of data that is acquired in a case where the image capturing scene is a game of soccer. FIG. 5A shows polygon data representing the three-dimensional shape of a player and FIG. 5B shows texture data representing the color and material appearance of the surface thereof. To each piece of polygon data, information indicating the attribute of each object, such as a player, a referee, a ball, and a soccer goal, is attached. Further, it may also be possible to make only the polygon data corresponding to an object of interest (for example, ball or specific player) identifiable from the other objects by attaching a predetermined flag. Further, it may also be possible to prepare a plurality of patterns of texture data in advance and selectively use in accordance with the position/orientation of the set virtual camera. The data representing the three-dimensional shape of an object may be so-called voxel data. The data thus acquired is output to the degree of transparency control unit 304 and the drawing unit 305.

At S403, the degree of transparency control unit 304 performs calculation processing of the degree of transparency for each object existing within the image capturing scene. Details of the degree of transparency calculation processing will be described later. Information on the calculated degree of transparency of each object is output to the drawing unit 305.

At S404, the drawing unit 305 generates a virtual viewpoint video image of the target frame based on the data acquired from the data acquisition unit 303, the camera parameters acquired from the viewpoint control unit 302, and the degree of transparency of each object acquired from the degree of transparency control unit 304. At this time, it may also be possible to make it possible to check the existence of an object by drawing the outline of the object independently of the degree of transparency. Further, it may also be possible to make less conspicuous a reduction in image quality by blurring an object in accordance with the degree of transparency. Furthermore, it may also be possible to adjust the density of a drawing of the shadow of an object made transparent in accordance with the degree of transparency or to draw independently of the degree of transparency. As to rendering, it may also be possible to appropriately apply an already-existing technique and the like and here, explanation is omitted. For the object whose degree of transparency is set to the maximum (object that is not displayed in the virtual viewpoint video image), transparent texture data may be mapped to the model representing the three-dimensional shape of the object and it may also be possible to perform rendering without using information representing the three-dimensional shape of the object. By performing rendering without using information representing the three-dimensional shape of the object, it is possible to reduce the processing load relating to generation of a virtual viewpoint video image. The data of the generated virtual viewpoint video image is output to the display unit 306.

At S405, the display unit 306 acquires the virtual viewpoint video image data of the target frame from the drawing unit 305 and displays the data. At S406 that follows, whether the processing at S401 to S405 has been completed for all the frames of the set frames is determined. In a case where there is an unprocessed frame, the processing returns to S401 and the processing is continued. On the other hand, in a case where the processing has been completed for all the frames, the processing is terminated.

The above is the flow of the image processing to generate a virtual viewpoint video image from a multi-viewpoint video image, which is performed by the image processing apparatus 100. At S402 of the present embodiment, the texture data generated in advance is also acquired, in addition to the shape data of the object, but this is not limited. For example, it may also be possible to acquire only the shape data of the object and find the texture data from the pixel value at the corresponding position in the actually captured image (multi-viewpoint image) based on the viewpoint position of the virtual camera at the time of rendering.

<Degree of Transparency Calculation Processing>

Figure 6:
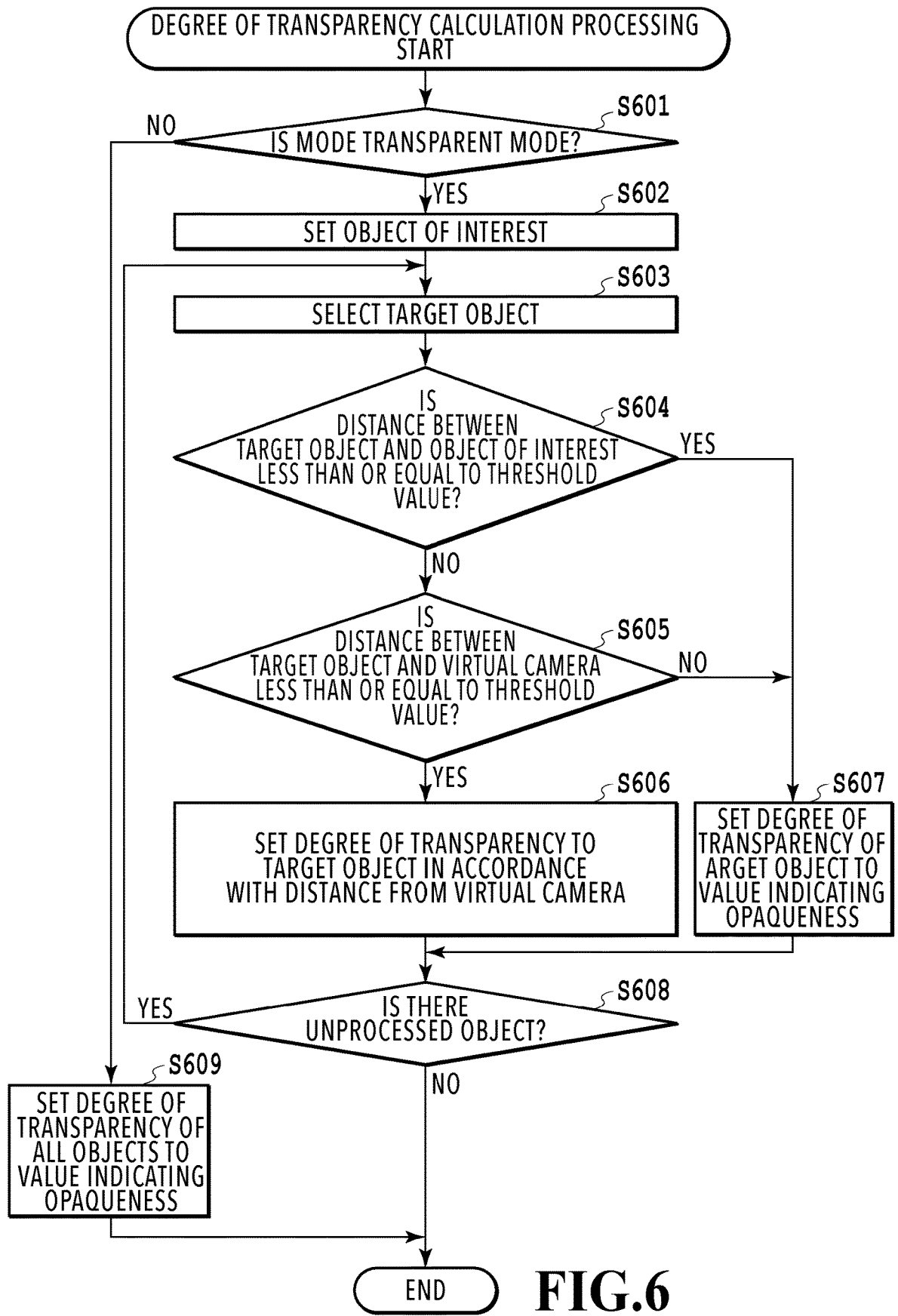
FIG. 6 is a flowchart showing details of degree of transparency calculation processing.

Following the above, the degree of transparency calculation processing for each object, which is the feature of the present embodiment, is explained in detail. FIG. 6 is a flowchart showing details of the degree of transparency calculation processing. In the following, explanation is given along the flow in FIG. 6.

At S601, whether the current operation mode is the operation mode in which the transparency control of an object is performed is determined. For example, in a case of an interactive reproduction mode in which a user him/herself performs control of the virtual camera at the time of generation of a virtual viewpoint video image, it is determined that the operation mode is the operation mode in which the transparency control is performed. Further, in a case of a person eye line reproduction mode in which the object is a person, such as a soccer player and a referee, and the field of view of the player, the referee, or the like is reproduced by using the position of the eye and the line-of-sight direction of the person as the position/orientation of the virtual camera, it is determined that the operation mode is the operation mode in which the transparency control is not performed. In a case of the person eye line reproduction mode, what should be captured (virtual viewpoint) in the field of view of the person is reproduced is more important than solving the problem of a reduction in resolution, and therefore, it may also be possible to perform the person eye line reproduction mode by selecting one from, for example, the list of the players (information capable of specifying a player, such as the name and the uniform number) and the referee. Further, it may also be possible to switch the operation mode to the interactive reproduction mode in a case where a user performs the operation to determine the virtual viewpoint in the person eye line mode. Further, also in a case of the operation mode in which, for example, the virtual viewpoint video image of a sports scene is displayed with analysis data or the like relating to the scene being overlapped, the analysis data is easier to see in a case where the transparency processing of an object is not performed, and therefore, it is determined that the operation mode is the operation mode in which the transparency control is not performed. Furthermore, it may also be possible for a user to specify whether to perform the transparency control by using a GUI (Graphical User Interface) or the like. In a case where the mode determination processing is performed in accordance with the reference such as this and it is determined that the operation mode is the operation mode in which the transparency control is performed, the processing advances to S602. On the other hand, in a case where it is determined that the operation mode is the operation mode in which the transparency control is not performed, the processing advances to S609 and the value of a degree of transparency α of all the objects captured in the target frame (included in the multi-viewpoint image) is set to the minimum value (degree of transparency at which transparency processing is not performed substantially) and this processing is exited. The degree of transparency α will be described later.

At S602, among all the objects captured in the target frame, the object of pixel that is excluded from the transparency processing target is set. Here, to the object of interest, an important object corresponds, which is indispensable to a scene, for example, a player who has made a shot and the ball in a case where the virtual viewpoint video image is generated by taking the goal scene of soccer as the target. At this time, which object is taken as the object of interest is determined in advance in accordance with the image capturing scene and the object of interest is set by, for example, referring to the flag described previously or the like. Alternatively, the object of interest may be automatically determined and set based on the shape or the size of the object. Further, it may also be possible for a user to perform the operation to specify the object of interest directly via the GUI and for the image processing apparatus 100 to determine the object of interest based on the input in accordance with the user operation. Alternatively, an object among a plurality of object, which is the object other than the object specified by a user may be determined as the object of interest. Further, it may also be possible for the image processing apparatus 100 to determine the object of interest based on the position and direction of the virtual viewpoint indicated by the camera parameters of the virtual camera and the position of the object. For example, an object located within a predetermined range from the center of the field of view in accordance with the position and direction of the virtual viewpoint may be determined as the object of interest. The reason is that the object located in the vicinity of the center of the field of view in accordance with the virtual viewpoint has a strong possibility of being an object a user who specifies the virtual viewpoint desires to view. Further, on the contrary, an object located outside a predetermined range including the center of the field of view in accordance with the virtual viewpoint may be determined as the object of interest.

At S603, one transparency processing target-object is selected from among objects other than the object of interest captured in the target frame. The method of selecting a target object from among a plurality of objects is not limited in particular and it may also be possible to select a target object randomly or in order of the object size. Further, in the present embodiment, all the objects other than the object of interest are sequentially selected as the target object, but it may also be possible to determine in advance a specific object that is taken as the transparency processing target. For example, in a case where the virtual viewpoint video image is generated by taking the goal scene of soccer as the target, a player, a referee, or the goal post is determined as the transparency processing target-object, other than those, that is, the ground, the spectator stand, or the ball is determined as an object that is not the transparency processing target, and so on. Further, it may also be possible to enable a user to specify the target object via the GUI.

At S604, a distance $d_1$ between the object of interest set at S602 and the target object selected at S603 is calculated and whether the calculated distance $d_1$ is less than or equal to a predetermined threshold value is determined. For example, in a case where the virtual viewpoint video image of the goal scene of soccer is generated, a predetermined distance (for example, three meters) from a player having scored a goal, who is the object of interest, is set as a threshold value th. By doing so, it is made possible to visually recognize a series of play relating to the object of interest, such as the movement of a player of the opponent team who has made an attempt to prevent the shot in the vicinity of the player having scored the goal. That is, the control that gives priority to the contents of the scene is performed rather the control to prevent a degradation in image quality. In a case where determination results indicate that the distance $d_1$ between the object of interest and the target object is less than or equal to the threshold value th, the processing advances to S607 so that the target object is drawn as it is without making the target object transparent. On the other hand, in a case where the distance $d_1$ between the object of interest and the target object is larger than the threshold value th, the processing advances to S605 so that the target object is made transparent in accordance with the distance thereof and then drawn.

Figure 7:
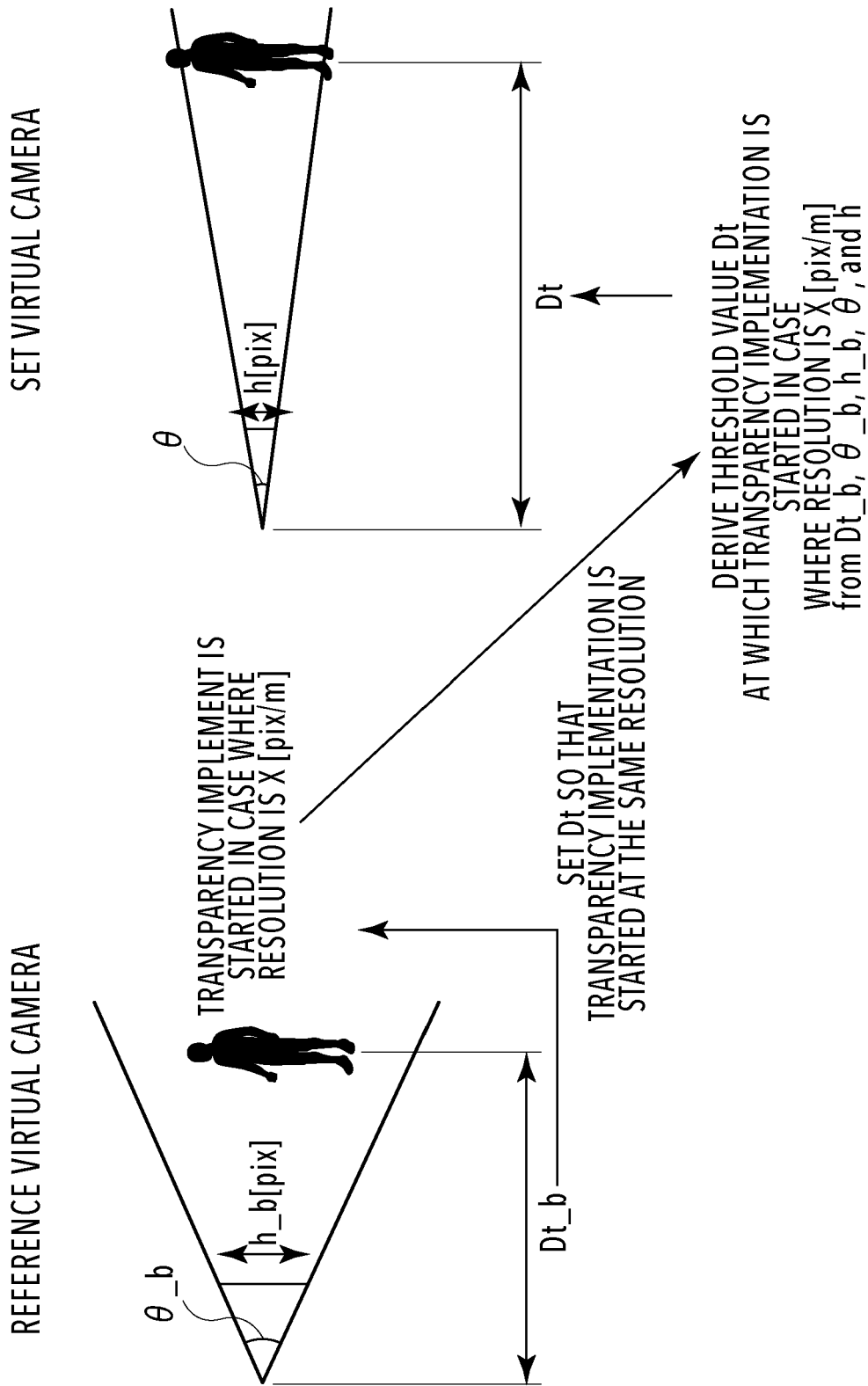
FIG. 7 is a diagram explaining a relationship between a reference transparency threshold value Dt_b and a transparency threshold value Dt.

At S605, a distance $d_2$ between the representative point of the target object selected at S603 and the viewpoint position (virtual viewpoint position) of the set virtual camera is calculated and whether the calculated distance $d_2$ is less than or equal to a predetermined threshold value is determined. Here, the representative point of the target object is the point representing the position of the object and for example, the global position of the local coordinate origin of the model or the center position of the model. Further, the threshold value here is a threshold value for determining whether to actually make the target object transparent. This threshold value is described as "transparency threshold value Dt" hereinafter in order to distinguish from the threshold value th at step 604 described above. In a case where the vertical resolution of the set virtual camera is h and the vertical angle of view thereof is θ, the transparency threshold value Dt that is applied to the determination processing changes based on a transparency threshold value for the virtual camera that is determined in advance as a reference (hereinafter, described as "reference transparency threshold value Dt_b"). The reference transparency threshold value Dt_b is defined by a number h_b of vertical pixels of the reference virtual camera and a vertical angle of view θ_b thereof and represents the distance from the reference virtual camera at which the transparency processing is started in the reference virtual camera. This reference transparency threshold value Dt_b is determined in advance by performing a test or the like. Then, the transparency threshold value Dt is derived so that the transparency processing is started also in the virtual camera actually set by a user at the same drawing resolution as the drawing resolution at which the transparency processing in the reference virtual camera is started and applied to the determination processing at this step. FIG. 7 is a diagram explaining a relationship between the reference transparency threshold value Dt_b and the transparency threshold value Dt. By making the transparency threshold value Dt variable as described above, it is made possible to apply an appropriate transparency threshold value in accordance with the resolution of an image captured by a real camera independently of the angle of view and the resolution of the virtual cameral. At this time, it may also be possible to set the reference transparency threshold value Dt_b in accordance with the kind of object (for example, referee and player). Further, it may also be possible to set the reference transparency threshold value Dt_b separately for each object (for example, player A and player B) or for each group of the object (for example, player belonging to A team and player belonging to B team). By setting the transparency threshold value Dt that is applied to the determination processing based on the reference transparency threshold value Dt_b, for example, in a case where the angle of view of the set virtual camera is narrow, the transparency threshold value Dt becomes large, and therefore, the transparency processing is performed appropriately also for the object whose distance from the set virtual camera is long. In a case where determination results indicate that the calculated distance $d_2$ is less than or equal to the transparency threshold value Dt, the processing advances to S606. On the other hand, in a case where the calculated distance $d_2$ is longer than the transparency threshold value Dt, the processing advances to S607. The lower the image quality of the multi-viewpoint image, the lower the image quality of the object is, which is displayed in the virtual viewpoint video image in a case where the distance between the virtual camera and object is short, and therefore, the reference transparency threshold value Dt_b may be determined based on the parameter relating to the image quality of the multi-viewpoint image. For example, the lower the resolution of the multi-viewpoint image, the larger the value of the reference transparency threshold value Dt_b may be set.

Figure 8:
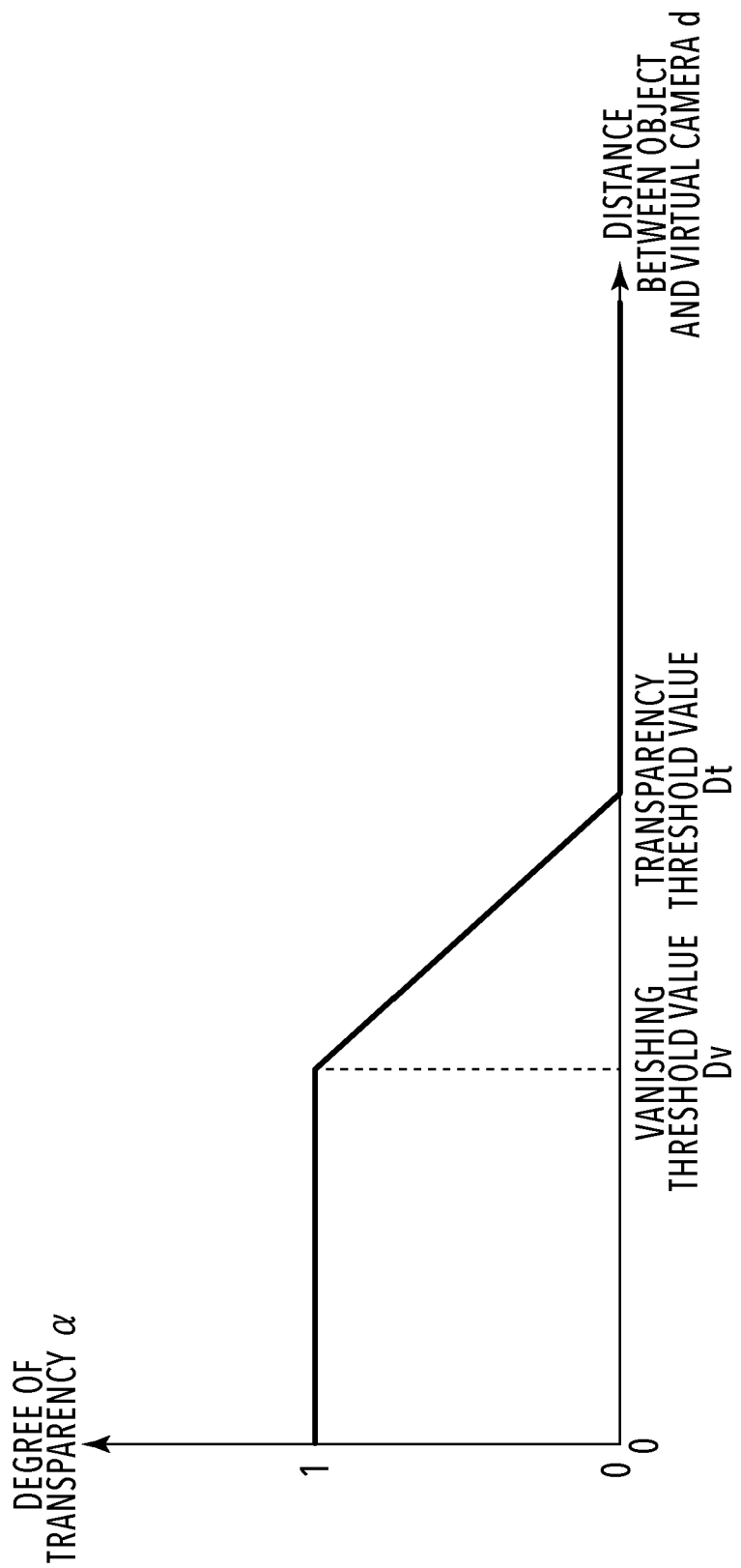
FIG. 8 is a graph representing a relationship between a distance from an object to a virtual camera and the degree of transparency.

At S606, based on the distance $d_2$ between the virtual camera and the object, which is calculated at S605, the degree of transparency α for the target object is calculated. Here, the degree of transparency α represents the opaque state in a case where the value is 0, represents the most transparent state in a case where the value is 1, and represents the translucent state in a case where the value is between 0 and 1. Then, for example, as represented by the graph in FIG. 8, calculation is performed so that the shorter the distance $d_2$, the higher the degree of transparency α is. In the graph in FIG. 8, a vanishing threshold value Dv is a threshold value indicating a predetermined distance in a case where the distance to the set virtual camera is short and within a predetermined distance and the target objects becomes the most transparent and the existence thereof vanishes. However. "vanishing" referred to here does not necessarily means the completely transparent state and may include, for example, a transparent state in a degree in which its existence can slightly be recognized. It is assumed that the vanishing threshold value Dv in a case where the vertical resolution of the set virtual camera is h and the vertical angle of view thereof is θ is variable like the transparency threshold value Dt. That is, the vanishing threshold value Dv of the set virtual camera is set so that the object becomes completely transparent (=degree of transparency α is the maximum) at the same resolution as the drawing resolution in a case of a vanishing threshold value (reference vanishing threshold value) Dv_b at the time of generating the virtual viewpoint video image by the reference virtual camera. A this time, the reference vanishing threshold value Dv_b is a threshold value that sets the value of the degree of transparency α of the target object to 1 (maximum value) in a case where the distance from the virtual camera is shorter than this distance on a condition that the number of vertical pixels of the reference virtual camera is h_b and the vertical angle of view thereof is θ_b. Here, the maximum value is taken to be 1, but as described above, for example, it may also be possible to take 0.9, which does not make the object completely transparent, as the maximum value. As described above, the degree of transparency α of the target object is calculated based on the vanishing threshold value Dv and the transparency threshold value Dt. The graph in FIG. 8, which represents the relationship between the degree of transparency α and the distance $d_2$ is merely an example. For example, in place of setting the degree of transparency α so as to change linearly as in FIG. 8, it may also be possible to set the degree of transparency α so as to change based on a predetermined quadratic function and it is sufficient to cause the degree of transparency α to change so that the shorter the distance from the virtual camera to the target object, the higher the degree of transparency is. Further, it may also be possible to create in advance a lookup table in which the distance that differs stepwise and the value of the degree of transparency α are associated with each other and set the degree of transparency α by referring thereto. At this time, in a case where the target object is approaching the virtual camera at a high speed, it may also be possible to adjust the degree of transparency α in accordance with the moving speed of the object or the moving speed of the virtual camera so that a higher degree of transparency is set. As the method of adjustment, a method is considered in which, for example, the final degree of transparency α is determined by multiplying the value of the degree of transparency α derived from the graph in FIG. 8 by a coefficient different for different moving speeds. Specifically, for example, in a case where the moving speed is the reference speed, the coefficient is set to 1.0 and as the speed increases from the reference speed, the value of the coefficient is set to 1.1, 1.2, 1.3, . . . and so on.

At S607, the value of the degree of transparency α for the target object is set to a value representing opaqueness (here, 0).

At S608, whether the transparency processing for all the objects other than the object of interest has been completed is determined. In a case where there is an unprocessed object, the processing returns to S603, and the next target object is selected and the transparency processing is continued. On the other hand, in a case where the transparency processing for all the objects other than the object of interest has been completed, this processing is terminated.

By the processing such as this, the degree of transparency for the object other than the object of interest is calculated.

In the present embodiment, whether the object is made transparent and in which degree the object is made transparent are determined in accordance with the distance from the object of interest and the distance from the virtual camera, but the determination is not limited to this. For example, it may also be possible to design a configuration in which to the object located at a position at which the object of interest is hidden in a case where the object of interest is viewed from the virtual camera, a higher degree of transparency (or complete transparency) is set uniformly. Further, in the present embodiment, in a case of the mode in which transparency control is not performed, the minimum value is set to the degree of transparency α for all the objects captured in the processing target-frame, but it may also be possible to design a configuration in which the normal drawing processing is performed for all the objects at S404 after setting all the objects as the non-target of the transparency processing.

As above, according to the present embodiment, even in a case where an object exists at a position near to the set virtual camera, transparency processing is performed under a certain condition, and therefore, a reduction in image quality is made less conspicuous. Due to this, it is possible to obtain a virtual viewpoint video image with a high image quality, which does not bring a sense of discomfort to a user.

OTHER EMBODIMENTS

It is also possible to implement the present invention by processing to supply a program that implements one or more functions of the above-described embodiments to a system or an apparatus via a network or a storage medium and to cause one or more processors in a computer of the system or the apparatus to read and execute the program. Further, it is also possible to implement the present invention by a circuit (for example, ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is explained so far with reference to the embodiments, but it is needless to say that the present invention is not limited to the embodiments described above. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
one or more memories storing instructions; and
one or more processors executing the instructions to:
obtain image data based on image capturing from a plurality of directions by a plurality of imaging apparatuses;
obtain virtual camera information for specifying a position of a virtual camera, a view direction from the virtual camera and an angle-of-view of the virtual camera, wherein the virtual camera corresponds to a virtual viewpoint image; and
generate, based on the obtained image data and the obtained virtual camera information, the virtual viewpoint image in accordance with the virtual camera,
wherein a degree of transparency of a moving object at a position at a specific distance apart from a position of the virtual camera in the virtual viewpoint image generated in accordance with a first angle-of-view of the virtual camera is higher than a degree of transparency of the moving object at the position at the specific distance apart from the position of the virtual camera in the virtual viewpoint image generated in accordance with a second angle-of-view of the virtual camera being wider than the first angle-of-view of the virtual camera, and
the virtual viewpoint image is generated in accordance with the angle-of-view of the virtual camera specified from the obtained virtual camera information and in which the shorter a distance of the moving object from a position of the virtual camera specified from the obtained virtual camera information among a plurality of moving objects located in an image capturing area of the plurality of imaging apparatuses, the higher a degree of transparency is.

2. The image processing apparatus according to claim 1, wherein
the degree of transparency of an object is determined based on a distance between the position of the object and the position of the virtual camera specified from the obtained virtual camera information and the angle-of-view corresponding to a virtual camera specified from the virtual camera information, and
a virtual viewpoint image including an object having the determined degree of transparency is generated.

3. The image processing apparatus according to claim 1, wherein
the virtual camera information includes information on a zoom value of the virtual camera.

4. The image processing apparatus according to claim 1, wherein
the specific distance is a distance determined based on resolution of the virtual viewpoint image.

5. The image processing apparatus according to claim 1, wherein
a virtual viewpoint image in which, among the plurality of objects, an object whose distance from the position of the virtual camera is more than or equal to a predetermined threshold value is not made transparent and an object whose distance from a position of the virtual camera is less than the predetermined threshold value is made transparent is generated.

6. The image processing apparatus according to claim 5, wherein
the predetermined threshold value is a threshold value determined based on an angle-of-view of the virtual camera specified from the obtained virtual camera information.

7. The image processing apparatus according to claim 1, wherein
the degree of transparency of an object is determined based on a distance between the position of the object and the position of the virtual camera specified from the obtained virtual camera information, the angle-of-view of the virtual camera specified from the obtained virtual camera information, and resolution of the virtual viewpoint image.

8. The image processing apparatus according to claim 1, wherein
the degree of transparency of a first object is determined based on the angle-of-view of the virtual camera specified from the obtained virtual camera information, a distance between a position of the first object and the position of the virtual camera, and a distance between a position of a second object different from the first object and the position of the first object.

9. The image processing apparatus according to claim 1, wherein
a degree of transparency of the object is determined based on at least one of the angle-of-view of the virtual camera specified from the obtained virtual camera information, a distance between the position of the object and the position of the virtual camera, a moving speed of the object, and a moving speed of the virtual camera.

10. The image processing apparatus according to claim 9, wherein
a virtual viewpoint image is generated in accordance with the angle-of-view of a virtual camera specified from the obtained virtual camera information and in which a degree of transparency of an object whose moving speed in a direction toward the virtual camera is a first speed is higher than a degree of transparency of an object whose moving speed in a direction toward a virtual camera is a second speed slower than the first speed.

11. The image processing apparatus according to claim 1, wherein the one or more processors further execute the instructions
to set whether to perform transparency processing for one or more objects among a plurality of objects located within an image capturing area of the plurality of imaging apparatuses, wherein
a virtual viewpoint image in which an object that is set as an object for which transparency processing is performed is made transparent in accordance with a determined degree of transparency and an object that is not set as an object for which transparency processing is performed is not made transparent is generated.

12. The image processing apparatus according to claim 1, wherein
a virtual viewpoint image in which an object is not made transparent in a case where virtual camera information taking a position and a line-of-sight direction of one of a plurality of objects located within an image capturing area of the plurality of imaging apparatuses as the position of the virtual camera and the view direction from the virtual camera specified from the obtained virtual camera information is generated; and a virtual viewpoint image in which an object is made transparent in accordance with the determined degree of transparency in a case where the virtual camera information not depending on a position and a line-of-sight direction of an object is generated.

13. The image processing apparatus according to claim 1, wherein
a virtual viewpoint image in which an object is not made transparent in a case of generating a virtual viewpoint image in which analysis data is overlapped is generated; and
a virtual viewpoint image in which an object is made transparent in accordance with the determined degree of transparency in a case of generating a virtual viewpoint image in which analysis data is not overlapped is generated.

14. The image processing apparatus according to claim 1, wherein the moving specific object is a person.

15. The image processing apparatus according to claim 1, wherein
the obtained image data includes at least one of polygon data, texture data, and voxel data.

16. An image processing method comprising:
obtaining image data based on image capturing from a plurality of directions by a plurality of imaging apparatuses;
obtaining virtual camera information for specifying a position of a virtual camera and a view direction from the virtual camera and an angle-of-view of the virtual camera, wherein the virtual camera corresponding to a virtual viewpoint image; and
generating, based on the obtained image data and the obtained virtual camera information, the virtual viewpoint image in accordance with the virtual camera,
wherein a degree of transparency of a moving object at a position at a specific distance apart from a position of the virtual camera in the virtual viewpoint image generated in accordance with a first angle-of-view of the virtual camera is higher than a degree of transparency of the moving object at the position at the specific distance apart from the position of the virtual camera in the virtual viewpoint image generated in accordance with a second angle-of-view of the virtual camera being wider than the first angle-of-view of the virtual camera, and
the virtual viewpoint image is generated in accordance with the angle-of-view of the virtual camera specified from the obtained virtual camera information and in which the shorter a distance of the moving object from a position of the virtual camera specified from the obtained virtual camera information among a plurality of moving objects located in an image capturing area of the plurality of imaging apparatuses, the higher a degree of transparency is.

17. The image processing method according to claim 16, wherein
the degree of transparency of an object is determined based on a distance between the position of the object and the position of the virtual camera specified from the obtained virtual camera information and the angle of view corresponding to a virtual camera specified from the virtual camera information, and
a virtual viewpoint image including an object having the determined degree of transparency is generated.

18. A non-transitory storage medium storing a program for causing a computer to perform an image processing method, the image processing method comprising:
obtaining image data based on image capturing from a plurality of directions by a plurality of imaging apparatuses;
obtaining virtual camera information for specifying a position of a virtual camera and a view direction from the virtual camera and an angle-of-view of the virtual camera, wherein the virtual camera corresponds to a virtual viewpoint image; and
generating, based on the obtained image data and the obtained virtual camera information, the virtual viewpoint image in accordance with the virtual camera,
wherein a degree of transparency of a moving object at a position at a specific distance apart from a position of the virtual camera in the virtual viewpoint image generated in accordance with a first angle-of-view of the virtual camera is higher than a degree of transparency of the moving object at the position at the specific distance apart from the position of the virtual camera in the virtual viewpoint image generated in accordance with a second angle-of-view of the virtual camera being wider than the first angle-of-view of the virtual camera, and
the virtual viewpoint image is generated in accordance with the angle-of-view of the virtual camera specified from the obtained virtual camera information and in which the shorter a distance of the moving object from a position of the virtual camera specified from the obtained virtual camera information among a plurality of moving objects located in an image capturing area of the plurality of imaging apparatuses, the higher a degree of transparency is.

* * * * *